United States Patent
Pundak et al.

(10) Patent No.: US 12,216,854 B2
(45) Date of Patent: Feb. 4, 2025

(54) ONLINE TUNING OF A TOUCH DEVICE PROCESSING ALGORITHM

(71) Applicant: Microsoft Technology Licensing, LLC, Redmond, WA (US)

(72) Inventors: Gilad Pundak, Rehovot (IL); Hanan Grinberg, Ramat-Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/180,714

(22) Filed: Mar. 8, 2023

(65) Prior Publication Data

US 2024/0302916 A1    Sep. 12, 2024

(51) Int. Cl.
G06F 3/041    (2006.01)
G06F 3/0354   (2013.01)
G06F 3/044    (2006.01)

(52) U.S. Cl.
CPC ...... *G06F 3/04162* (2019.05); *G06F 3/03545* (2013.01); *G06F 3/0418* (2013.01); *G06F 3/0442* (2019.05); *G06F 3/0446* (2019.05); *G06F 2203/04101* (2013.01)

(58) Field of Classification Search
CPC .......... G06F 3/04162; G06F 3/03545; G06F 3/0418; G06F 3/0442; G06F 3/0446; G06F 2203/04101; G06F 3/046
See application file for complete search history.

(56) References Cited

U.S. PATENT DOCUMENTS

| | | |
|---|---|---|
| 2006/0227116 A1 | 10/2006 | Zotov et al. |
| 2014/0184554 A1 | 7/2014 | Walley |
| 2017/0255283 A1* | 9/2017 | Yeh ........................ G06F 3/0418 |
| 2018/0079254 A1 | 3/2018 | Neubauer |
| 2019/0018527 A1* | 1/2019 | Barel ..................... G06F 3/0418 |
| 2019/0235649 A1 | 8/2019 | Oyama et al. |
| 2023/0418416 A1* | 12/2023 | Grinberg ............... G06F 3/0412 |

FOREIGN PATENT DOCUMENTS

KR    101143276 B1    5/2012

OTHER PUBLICATIONS

International Search Report and Written Opinion received for PCT Application No. PCT/US2024/017785, Jun. 20, 2024, 15 pages.

\* cited by examiner

*Primary Examiner* — Temesghen Ghebretinsae
*Assistant Examiner* — Ivelisse Martinez Quiles
(74) *Attorney, Agent, or Firm* — Weaver IP L.L.C.

(57) ABSTRACT

Systems, methods, and instrumentalities are described herein related to online tuning of pen characterizations. Online tuning may be performed during use of a pen with a touch device. A digitizer may detect signals associated with the pen and noise. A touch controller may execute a signal characterization model that characterizes the detected signals and an online tuner that processes the detected signals to perform online tuning of the signal characterization model. Online testing may validate an online-tuned signal characterization model for online use. Tuning may be based on signal statistics, such as mean or average signal gradients in the detected signals. Signal characterization models may include positioning, signal locating, noise reduction, communication decoding, etc.

20 Claims, 7 Drawing Sheets

ONLINE TUNING OF A TOUCH DEVICE PROCESSING ALGORITHM

BACKGROUND

Touchscreen pens are used with touchscreen computing devices to enable a user to write or draw on a touchscreen in the form of digital ink. The digital ink is captured and stored in the computing device in digital form (as digital data), enabling the digital ink to be used in various applications (e.g., converted to text, etc.). Touchscreen digitizers may process or characterize operations based on detected signals associated with the proximity of touchscreen and touchscreen pen. Detected signals may include noise (e.g., display noise, power supply noise, and/or environment noise). Touchscreen pen characterization performance may vary between different conditions and/or working points for touchscreens and touchscreen pens in the same and different environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable online tuning of touchscreen pen characterizations. Online tuning may be performed during use of a touchscreen pen with a touch device. Such online tuning may be performed with supervised learning (e.g., using a factory or default signal characterization model developed offline). The online tuning enables improved performance of the touchscreen pen, such as by sharper received inking signal, better filtering out of a user hand resting on the touchscreen, etc.

A touch device communicates with a touchscreen pen. A touch device digitizer with an antenna array detects signals in an array grid of sensing elements (antennas) while the touchscreen pen is proximate to (e.g., in use relative to) the touch device. A processing circuit (e.g., a "touch controller" or "digitizer processor" in the digitizer) electrically coupled to the antenna array executes a processing algorithm (e.g., a "signal characterizer" or "characterization model") configured to process (e.g., characterize) the detected signals. The processing circuit may also be configured to execute an online tuning algorithm configured to perform online tuning (e.g., calibration) of the processing algorithm based on the detected signals by tuning at least one parameter of the processing algorithm to create an online-tuned processing algorithm (e.g., with online-tuned parameter(s)).

The processing algorithm may include, for example, a positioning algorithm configured to determine a center of mass of the touchscreen pen (e.g., relative to the antenna array); an orientation estimation to determine a direction of pen (e.g., tilt, azimuth); a signal locating algorithm configured to determine signal boundaries for a (e.g., coupling, proximity) signal associated with the touchscreen pen; a noise reduction algorithm configured to determine a noise boundary; and a communication algorithm configured to determine signal decoding parameters for a communication signal associated with the touchscreen pen.

Online tuning may be performed opportunistically, such as when one or more online tuning conditions are satisfied. Opportunistic processing of the detected signals may be performed when at least one online tuning condition is satisfied. The online tuning of the at least one parameter may be performed based on the opportunistic processing of the detected signals.

Conditional or opportunistic processing may include, for example, processing detected signals to estimate a distance of the touchscreen pen from the touch device. Signal statistics for the detected signals may be determined, for example, opportunistically, if the estimated distance meets predetermined tolerances (e.g., greater than a first threshold distance and less than a second threshold distance). The at least one parameter (e.g., a threshold decision boundary) may be tuned based on the aggregated signal statistics (e.g., by generating at least one tuned parameter).

Signal statistics may comprise, for example, a mean (average) signal gradient between antennas, where the complex gradient of a scalar-valued differentiable function f of several variables is the vector field (or vector-valued function) $\nabla f$, whose value at a point p is the direction and rate of fastest increase. In particular, Equation 1 below shows an example formula for calculation of the complex gradient with respect to a pair of antenna elements:

$$\text{Complex Grad}_N(X_i) = \text{Real}(X_i) - \text{Real}(X_{i+N}) + i(\text{Imag}(X_i) - \text{Imag}(X_{i+N}))$$

Equation 1

Where:
i=an index for an antenna element in an antenna array,
Xi=the signal for antenna element i, and
N=the gradient number (GradN).

A complex gradient ("gradient") may be determined between antenna element pairs of an antenna array of a touch screen that corresponds to a signal difference between the antenna elements. The antenna elements pairs for which a gradient is determined may be antenna elements that are adjacent to each other (no antenna elements between them) or antenna elements further spaced apart, such as antenna elements a distance of two from one another (one antenna element in between them) for a Grad2 gradient determination, antenna elements a distance of three from one another (two antenna elements in between them) for a Grad3 gradient determination, antenna elements a distance of four from one another (three antenna elements in between them) for a Grad4 gradient determination, etc. By determining gradients between antenna elements, regions when a pen is nearby (e.g., in active use) may be distinguished from regions where a pen is not nearby. For example, if, at a time the pen is in range of a touch screen, antenna element pairs in a first region of the antenna array of the touch screen have similar gradient measurements, this may indicate the first region as being away from the pen (and thus, not affected by pen signal), and thus the antenna elements of the first region have primarily noise-based signals (e.g., noise signal inherent to the antenna element, surrounding antenna elements, the environment, etc.). One or more antenna elements of this first region may be considered as having characteristic noise-based signal for the antenna array. Thus, their signal may be useable for tuning purposes, either individually or averaged with that of nearby antenna elements. In contrast, if, at a time the pen is in range, antenna element pairs in a second region of the antenna array have differing gradient measurements, this may indicate the second region as being near the pen, with some antenna elements of the second region being affected by the pen signal (e.g., having a greater signal that is composed of pen signal plus noise signal) and others of the second region being less or non-affected by pen signal (e.g., having lesser signals based primarily on noise signal), leading to the increased gradients (differences in signal). The antenna elements of the second region affected by pen signal may be less suitable for tuning of parameters as described herein due to possible inclusion of pen signal (and thus being less representative of touch screen noise). The antenna elements of the second region that are less affected by pen signal may be suitable for tuning of parameters as described herein.

A tunable parameter may comprise, for example, a decision boundary threshold that the processing algorithm uses to identify a boundary for at least one of noise signal or touchscreen pen signal or to distinguish between noise signal and touchscreen pen signal.

A processing algorithm may be tuned (e.g., updated or reconfigured) based on online testing and validation. An online test of the online-tuned processing algorithm may be performed while the touchscreen pen is in proximity to the touch device. The online-tuned processing algorithm may be validated if the test is passed. The online-tuned configuration of the processing algorithm may be validated if the test is passed. The online-validated online-tuned configuration of the processing algorithm may be implemented (e.g., in place of the offline configuration of the processing algorithm).

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
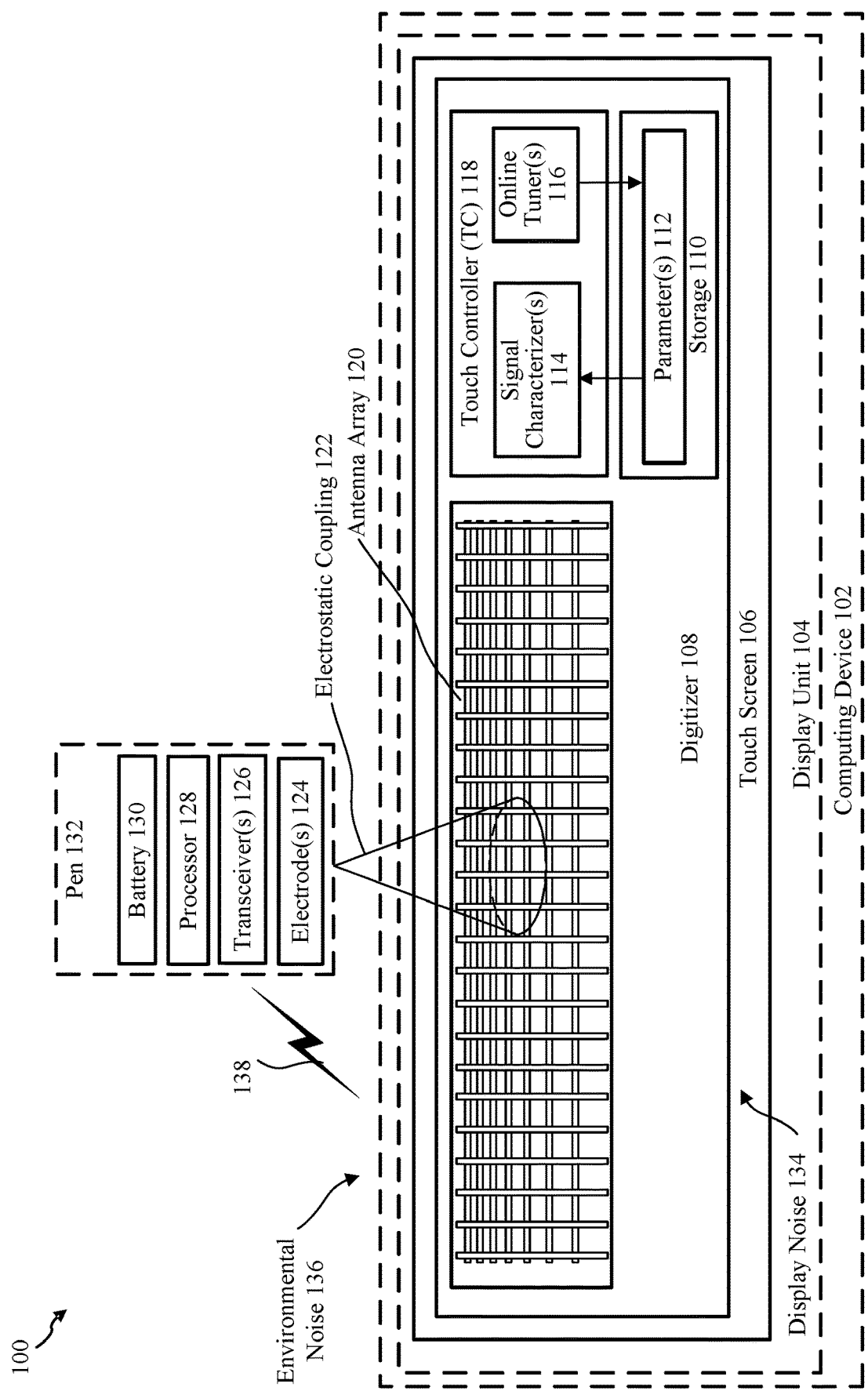
FIG. 1 shows a block diagram of a system for online tuning of touchscreen pen characterizations, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

II. Example Embodiments

As set forth in the Background section, touchscreen pens, also referred to herein as simply "pens," are often used with touchscreen computing devices. Touchscreen digitizers may process or characterize operations based on detected signals associated with the proximity of touchscreen and pen.

However, detected signals may include noise (e.g., display noise, power supply noise, and/or environment noise) and/or interference (e.g., undesirable signals that are not fully random like noise, but interfere with the sending of the pen signal). Further, pen characterization performance may vary between different conditions and/or working points of touchscreens and pens. Offline (e.g., in factory, during manufacturing, prior to touch device sale) generation of detected signals characterizers may be limited in several respects. First, offline-generated characterizers may be limited to a handful of different conditions and/or working points of touch devices and pens, failing to address a wide variety of such conditions and/or working points. Tuning for all conditions and/or working points would be cost prohibitive and may consume significant resources when a given touch device many be used with only one or a few pens. Small digitizers may limit an ability to properly select regions of interest (ROIs), such as regions without a pen signal (e.g., pure noise regions), which may limit performance and tuning for hover and inking modes. The result of various issues may be inferior performance, which may lead to user frustration and dissatisfaction with touchscreen computing devices and/or pens used in the same and different environments.

As such, methods, systems, and computer program products are provided for enabling online tuning of pen characterizations to improve performance of pens and touch devices that users choose to use together. "Online tuning," as used herein, refers to the tuning of a particular touchscreen pen during actual use (e.g., after leaving factory) of the touchscreen pen with regard to a particular touchscreen device rather than pen tuning being performed in a controlled calibration environment (e.g., prior to leaving factory) and applied to pens broadly. Online tuning may be performed with supervised learning (e.g., beginning with a factory or default signal characterization model developed offline). Such online tuning offers the benefit of tuning a particular pen with respect to a particular touch screen device to develop calibration parameters specific to that pen, thereby taking into account the particular electrical and noise traits of that pen and touch screen device, rather than the pen being loaded with standard calibration parameters developed beforehand in a controlled calibration environment with respect to a representative pen and touch screen combination.

For example, during online tuning, a touch device digitizer with an antenna array may detect (e.g., pen and noise) signal in an array grid of sensing elements while the pen is proximate to the touch device. A processing circuit (e.g., a touch controller in the digitizer) electrically coupled to the antenna array may be configured to execute a processing algorithm configured to characterize the detected signals. The processing circuit may also be configured to execute an online tuner (e.g., online tuning algorithm) configured to perform online tuning (e.g., calibration) of the processing algorithm based on the detected signals by tuning at least one parameter of the processing algorithm to create an online-tuned processing algorithm (e.g., with online-tuned parameter(s)). Tuning parameters of the processing algorithm based on detected signals enables noise rejection specific to the pen and touch screen in use.

The processing algorithm may be tuned (e.g., updated or reconfigured) based on online testing and validation. An online test of the online-tuned processing algorithm may be performed while the pen is in proximity to the touch device. The online-tuned processing algorithm may be validated if the test is passed. The online-tuned configuration of the processing algorithm may be validated if the test is passed. The online-validated online-tuned configuration of the processing algorithm may be implemented (e.g., in place of the offline configuration of the processing algorithm).

The processing algorithm may include, for example, a positioning algorithm configured to determine a center of mass of the pen (e.g., relative to the antenna array); a signal locating algorithm configured to determine signal boundaries for a (e.g., coupling, proximity) signal associated with the pen; a noise reduction algorithm configured to determine a noise boundary; and a communication algorithm configured to determine signal decoding parameters for a communication signal associated with the pen.

Online tuning may be performed opportunistically, e.g., when one or more online tuning conditions are satisfied. Opportunistic processing of the detected signals may be performed when at least one online tuning condition is satisfied. The online tuning (e.g., calibration) of the at least one parameter may be performed based on the opportunistic processing of the detected signals. Opportunistic tuning enables the online tuning to be performed when suitable conditions exist rather than the online tuning being performed at other times and having less desirable results (e.g., reduced accuracy).

Conditional or opportunistic processing may include, for example, processing detected signals to estimate a distance of the pen from the touch device. Signal statistics for the detected signals may be determined (e.g., and aggregated), for example, opportunistically, if the estimated distance meets predetermined tolerances (e.g., greater than a first threshold distance and less than a second threshold distance). The at least one parameter (e.g., a threshold decision boundary) may be tuned based on the aggregated signal statistics (e.g., by generating at least one tuned parameter). Basing the tuning of parameters based on signal statistics determined when the estimated pen distance is within acceptable tolerances enables improved noise rejection.

Signal statistics may comprise, for example, an average signal gradient between antennas and/or a mean signal gradient between antennas.

A tunable parameter may comprise, for example, a decision boundary threshold that the processing algorithm uses to identify a boundary for at least one of noise signal or pen signal or to distinguish between noise signal and pen signal. Determination of such a boundary enables improved rejection of noise signal, and thus improved pen performance.

"Hover height" (a/k/a distance, proximity) of a pen relative to a touch device may be determined by force, orientation, and distance detector components of a proximity detector, which may apply logic to sensor data or received signal characteristics (e.g., energies) to determine proximity information. A transmission manager may analyze proximity information to determine whether to adapt/modify a transmission configuration. An electrostatic communication link between a touch interface and a pen may be broken when a hover height (e.g., distance between pen and touch device) exceeds a particular distance, such as approximately 10 mm.

Embodiments may be configured in various ways in various embodiments. For instance, FIG. 1 shows a block diagram of a system 100 for online tuning of pen characterizations, in accordance with an example embodiment. As shown in FIG. 1, example system 100 includes a computing device 102 and a pen 132. Computing device 102 includes a display unit 104, which includes a touchscreen 106, which includes a digitizer 108. Digitizer 108 includes an antenna array 120 (which includes a two-dimensional array of antenna elements/electrodes), a storage 110, and a touch controller (TC) 118. Touch controller 118 includes one or more signal characterizers 114 and one or more online tuners 116. Pen 132 includes a battery 130, a processor 128, one or more transceivers 126, and one or more electrodes 124. These components of system 100 are described in further detail as follows.

Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 102 may include one or more applications, operating systems, virtual machines (VMs), storage devices, etc., that may be executed, hosted, and/or stored therein or via one or more other computing devices via network(s) (not shown). Computing device 102 may execute one or more processes in one or more computing environments. A process is any type of executable (e.g., binary, program, application) that is being executed by a computing device. A process may include an automated pairing process. A computing environment may be any computing environment (e.g., any combination of hardware, software, and firmware). An example computing device with example features is presented in FIG. 8.

Computing device 102 may be a touch device. Computing device (e.g., touch device) 102 may be configured to execute software applications that cause content to be displayed to users via UIs (e.g., touchscreen 106) associated with touch interfaces (e.g., digitizer 108). Software applications may enable users to provide selection indicia for content, to perform inking operations, etc., via touch interfaces (digitizer 108) and pens (pen 132).

Computing device 102 may include display unit 104, which may comprise touchscreen 106. Touchscreen 106 may include an integrated touch interface (e.g., touchscreen or touch pad) or a peripheral touch interface that interfaces with or comprises digitizer 108 for interaction with pens. Touchscreen 106 may be utilized by users through interaction with pens, such as pen 132, e.g., to perform inking operations. Touchscreen 106 may comprise digitizer 108.

Digitizer 108 may detect pen (e.g., pen 132) operation with contact (e.g., zero (0) hover height) or without contact (e.g., hover height >0). Digitizer 108 may comprise or interface with one or more antennas (e.g., antenna array 120), a controller (e.g., touch controller (TC) 118), storage (e.g., storage 110), and/or the like. Digitizer 108 may detect interactions and communications (e.g., commands and/or information) associated with pen 132. For example, digitizer 108 may be configured to receive/transmit communication signals via an antenna or antennas from/to pen 132.

Antennas (e.g., electrodes) in antenna array 120 may detect signal (e.g., coupling and transmission signal) associated with operations using pen 132. Antenna array 120 may detect signal in a variety of forms and sources, such as wirelessly communicated signals 138, electrostatic coupling 122, display noise 134, environmental noise 136, etc. Detected signals may vary among antennas in antenna array 120. For example, as indicated by the conical shape of electrostatic coupling 122, antennas further from pen 132 may detect less signal than antennas closer to pen 132. Similarly, detected signals from noise sources may vary, e.g., by distance from a source. Digitizer 108 may characterize detected signals, for example using TC 118.

TC 118, as a controller or processor of digitizer 108, may receive and process interactions and communications (e.g., commands and/or information) associated with pen 132, for example, to determine when and/or where to implement inking operations, erasing operations, provide feedback, etc. TC 118 may determine interactions and communications by processing signals detected by antenna array 120. TC 118 may include a processor (e.g., a microcontroller) configured to execute one or more detected signals characterization programs (e.g., signal characterizer(s) 114). Signal characterizer(s) 114 may characterize one or more aspects of detected signals based on one or more parameters (e.g., parameter(s) 112) storage in storage 110. A tunable parameter (e.g., parameter(s) 112) may comprise, for example, a decision boundary threshold that the processing algorithm (e.g., TC 118 uses to identify a boundary for at least one of noise signal or pen signal or to distinguish between noise signal and pen signal.

A processor (e.g., a microcontroller) in TC 118 may be configured to execute one or more online tuning programs (e.g., online tuner(s) 116) to tune one or more signal characterizer(s) 114, e.g., by tuning one or more parameter (s) 112, while a user is using pen 132. FIGS. 2-7 provide examples of online tuning performed by online tuner(s) 116.

A user may use a pen (e.g., pen 132) to interact with a touch interface of computing device 102 (e.g., via digitizer 108). Pen 132 may be an active or passive device, including the example in FIG. 1, where pen 132 is an active device. It is noted, however, that embodiments are directed to other forms of touch than by pen. As used herein, pen refers to numerous implements and instruments that enable touch, including without limitation, an active device pen, a passive device pen (e.g., a capacitive pen), a stylus, a light pen, a digital pen, a wearable device for a user's finger, a glove, etc. A pen may be held and wielded by a user to interface with computing device 102 to perform functions such as selecting objects, writing/inking, shading (e.g., low force inking), erasing, and/or the like. For example, when the pen is in contact with the touch device, inking operations may be desired by the user, but when the pen hovers above the touch device, the user may desire inking operations to cease.

Pen 132 may include battery 130, processor 128, transceiver(s) 126, and electrode(s) 124. Battery may power processor 128 and transceiver(s) 126, and/or charge electrode(s) 124. Processor 128 may execute one or more programs related to operations of pen 132, such as communication (e.g., transmission and/or reception) of commands and/or information between pen 132 and computing device 102. Processor 128 may send/receive communications through transceiver(s) 126.

Online tuning may provide in-field customization of (e.g., factory or default) signal characterizer(s) for specific conditions and/or working points of pen 132 and digitizer 108. Online tuning (e.g., in-field customization) may improve performance and customer satisfaction, which may result in reduced time using computing device 102 and reduced energy consumption by accurate interpretation of user operations and avoiding repetitious attempts seeking accurate interpretation after one or more misinterpretations.

Figures 2, 3:
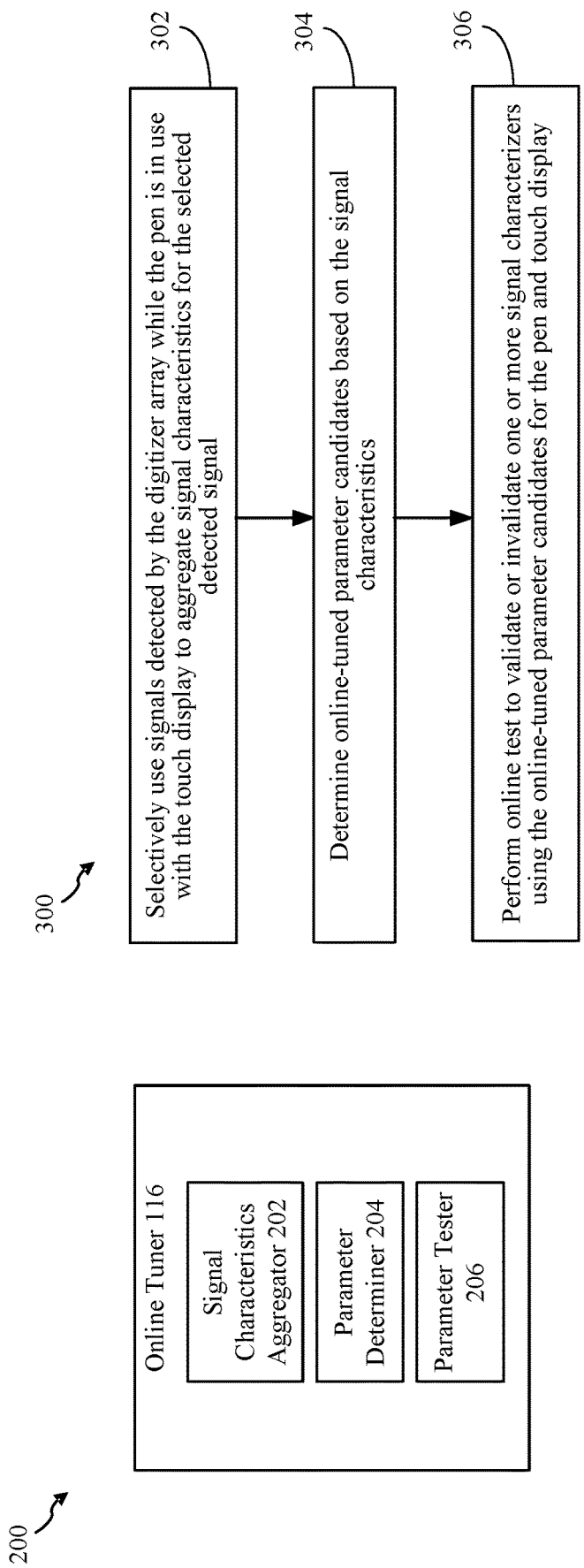
FIG. 2 shows a block diagram of an online tuner, in accordance with an example embodiment.
FIG. 3 shows a flowchart of a process for online tuning of touchscreen pen characterizations, in accordance with an embodiment.

As indicated with respect to FIG. 1, computing device 102 may passively or actively communicate with pen (e.g., pen) 132, for example, via electric coupling and/or via one or more wireless communication interfaces. Digitizer 108 with antenna array 120 may detect signal in an array grid of sensing elements while pen 132 is proximate to (e.g., in use relative to) computing device 102. A processing circuit (e.g., touch controller (TC) 118 in digitizer 108) electrically coupled to antenna array 120 may (e.g., be configured to) execute a processing algorithm (e.g., signal characterizer(s) 114) that is configured to process (e.g., characterize) the detected signals. The processing circuit (e.g., TC 118) may also be configured to execute an online tuning algorithm (e.g., online tuner(s) 116) that is configured to perform online tuning (e.g., calibration) of the processing algorithm (e.g., signal characterizer(s) 114) based on the detected signals by tuning at least one parameter (e.g., parameter(s) 112) of the processing algorithm to create an online-tuned processing algorithm (e.g., with online-tuned parameter(s)). FIG. 2 shows an example of online tuner(s) 116.

FIG. 2 shows a block diagram of an online tuner, in accordance with an example embodiment. FIG. 2 shows one of many example implementations of an online tuner 116 of online tuner(s) 116. As shown in FIG. 2, online tuner 116 may include a signal characteristics aggregator 202, a parameter determiner 204, and a parameter tester 206. These components of online tuner 116 are described in further detail as follows.

Online tuner 116 may tune one or more signal characterizer(s) 114, e.g., by tuning one or more parameter(s) 112, as shown in FIG. 1. Signal characterizer(s) 114 (e.g., also referred to as signal processing algorithms) may process detected signals (e.g., signal detected by antennas in antenna array 120), for example to determine various regions of interest (ROI) thresholds or ranges (e.g., decision boundaries) for various algorithms that characterize detected signals.

Signal characterizer(s) 114 may include, for example, one or more of the following: a positioning algorithm configured to determine a location and/or orientation (e.g., a center of mass) of the pen (e.g., pen 132 relative to antenna array 120); a signal locating algorithm configured to determine signal boundaries for a signal (e.g., coupling, proximity signal) associated with the pen; a noise (e.g., antenna array 120) reduction algorithm configured to determine a noise boundary (e.g., for display noise, power supply noise, and/or environmental noise); and/or a communication algorithm configured to determine signal decoding parameters (e.g., digital data parsing) for a communication signal associated with the pen. The positioning algorithm, which determine pen location relative to touch screen, enhances the ability to select antenna elements relatively close to the pen, but still having signals relatively unaffected by pen signal, for use of their signals in online tuning. Similarly, the signal locating and noise reduction algorithms may enhance selection of antenna elements relatively close to the pen, but still having signals relatively unaffected by pen signal, for use of in online tuning.

In an example, a pen signal and/or noise aggregation signal characterizer may seek to determine which antennas have detected signals signals/samples that are pure pen signal and/or which antennas have detected signals signals/samples that are pure noise. These signal characterizers may determine the boundaries for pure pen signal and/or pure noise. Signal characteristics/statistics (e.g., signal gradient mean, average) for detected signals may be used to determine the boundaries at various detectable hover heights.

A complex gradient (magnitude and phase) of signals between an antenna to another antenna that is two (2) antennas to the right, two antennas to the left, etc. may be referred to as Grad2. The complex gradient of signals between an antenna to another antenna that is three (3) antennas to the right, three antennas to the left, etc. may be referred to as Grad3. Grad2 and Grad3 signal statistics may be determined for pen signal and noise at different hover heights. A pen signal/noise characterizer(s) (e.g., algorithm(s)) may (e.g., ultimately) remove noise (e.g., display noise). A determination of antennas (e.g., electrodes) with pure noise may be used to remove noise from signals detected by other electrodes (e.g., with mixed pen signal and noise). Signal characteristics/statistics, such as mean gradient and/or average gradient may be determined and used by signal/noise characterizer(s) to determine signal/noise boundaries. One or more parameters (e.g., thresholds) may be used by signal/energy characterizers to determine signal/noise boundaries. Thresholds may relate to gradient, magnitude, etc. The parameters may be used, for example, to select a boundary (e.g., a rectangular area). The parameters may vary between different conditions and/or working points of pen and touch device. Online tuning may improve touch performance by adjusting one or more parameters.

Signal characteristics aggregator 202 may (e.g., be configured to) aggregate signal characteristics (e.g., in the form of signal statistics) for one or more signal characterizer(s) 114 that are subject to online tuning by online tuner 116. Signal characteristics aggregator 202 may opportunistically use signals detected by digitizer 108 (e.g., antenna array 120) while pen 132 is in use with touchscreen 106 (e.g., online) to calculate and/or aggregate signal statistics based on the detected signals (e.g., measurements). Signal characteristics/statistics may include, for example, signal gradients, mean signal gradient, average signal gradient, etc. Signal gradients may be the complex difference between signals detected at various antennas. For example, grad2 statistics may represent the complex gradient between signal levels detected at two antennas with one antenna between and grad3 statistics may represent a complex gradient between signal levels detected at two antennas with two antennas between. A mean and/or average gradient may be calculated for grad2 and grad3 gradients.

In some implementations, signal characteristics aggregator 202 may opportunistically (e.g., conditionally) aggregate signal statistics as a user uses pen 132. For example, a condition for opportunistic collection of signal statistics may be hover height. Signal characteristics aggregator 202 may aggregate signal statistics, for example, (e.g., only) when pen 132 is hovering over digitizer 108 (e.g., if the estimated hover height meets predetermined tolerances), but not when pen 132 is touching digitizer 108. A condition may be imposed, for example, for performance (e.g., usefulness and/or accuracy of collected signal statistics). Thus, signal characteristics aggregator 202 may aggregate signal statistics over time, e.g., in one or more user sessions, until a sufficient number of signal detection samples are gathered to calculate a sufficient number of signal statistics. In some examples, a minimum number of samples and/or signal statistics may be 1000.

Parameter determiner 204 may determine one or more online-tuned parameter candidates to potentially replace one or more parameters 112 used by signal characterizer(s) 114 to characterize detected signals. In various implementations, parameter determiner 204 may perform calculations and/or use one or more look-up tables (LUTs) 208 (e.g., stored in storage 110) to determine online tuned parameter(s). For example, parameter determiner 204 may look up the calculated aggregate signal statistics (e.g., mean gradient, average gradient) in LUT(s) 208 to determine (e.g., identify or select) one or more online tuned parameter candidates.

Parameter tester 206 may perform online testing to validate or invalidate online-tuned parameter candidates for use by signal characterizer(s) 114 to characterize detected signals. Parameter tester may operate/implement a version of signal characterizer(s) 114 with online-tuned parameter candidate(s). Parameter tester 206 may compare the performance of the online-tuned signal characterizer candidate(s) to one or more performance metrics to determine whether to validate or invalidate the online-tuned parameter candidate(s). Parameter tester 206 may store validated online-tuned parameter candidate(s), for example, in place of or in addition to respective parameter(s) 112 for (e.g., future) use by (e.g., online tuned) signal characterizer(s) 114. The online-validated online-tuned processing algorithm based on online-tuned parameter(s) 112 may be implemented (e.g., in place of the processing algorithm). Parameter tester 206 may discard invalidated online-tuned parameter candidate(s).

FIG. 3 shows a flowchart of a process for online tuning of pen characterizations, in accordance with an embodiment. FIG. 3 shows an example flowchart 300 of a process for performing online tuning of pen characterizations. Online tuner(s) 116, as shown by examples in FIGS. 1 and 2, may operate according to flowchart 300 in some embodiments. Various embodiments may implement one or more steps shown in FIG. 3 with additional and/or alternative steps. Further structural and operational embodiments will be apparent to persons skilled in the relevant art(s) based on the following description of FIG. 3.

Flowchart 300 includes step 302. In step 302, signals detected by the digitizer array while the pen is in use with the touch display may be selectively used to (e.g., opportunistically) aggregate signal characteristics for the selected detected signals. For example, as shown in FIGS. 1 and 2, online tuner(s) 116 (e.g., signal characteristics aggregator 202) may opportunistically (e.g., conditionally) aggregate signal statistics as a user uses pen 132.

In step 304, online-tuned parameter candidate(s) (e.g., signal and/or noise decision boundary thresholds) may be determined based on the signal characteristics. For example, as shown in FIGS. 1 and 2, online tuner(s) 116 (e.g., parameter determiner 204) may determine one or more online-tuned parameter candidates to potentially replace one or more parameters 112 used by signal characterizer(s) 114 to characterize detected signals.

In step 306, online testing may be performed to validate or invalidate the signal characterizer(s) using the online-tuned parameter candidate(s) for the pen and touch display. For example, as shown in FIGS. 1 and 2, online tuner(s) 116 (e.g., parameter tester 206) may perform online testing to validate or invalidate online-tuned parameter candidates for use by signal characterizer(s) 114 to characterize detected signals.

FIGS. 4-7 show additional examples of processes that may be implemented by online tuner(s) 116.

Figure 4:
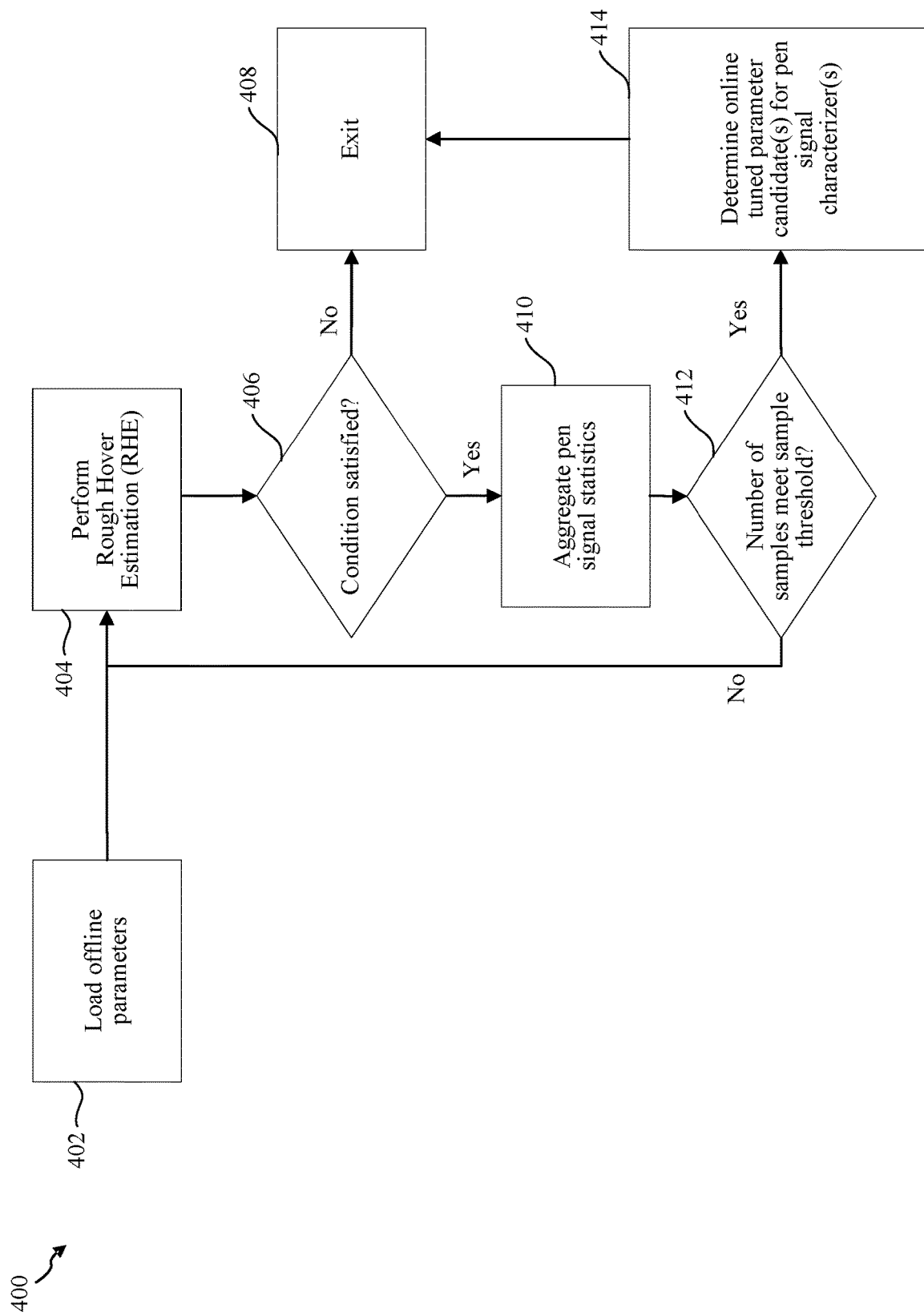
FIG. 4 shows a flowchart of an example process for calculating touchscreen pen signal boundary determination parameters, in accordance with an embodiment.

FIG. 4 shows a flowchart 400 of a process for calculating pen signal boundary determination parameters, in accordance with an embodiment. FIG. 4 shows an example flowchart 400 of a process for aggregating signal characteristics/statistics and using them to determine online tuned parameter candidate(s) for pen signal characterizer(s). Online tuner(s) 116, as shown by examples in FIGS. 1 and 2, may operate according to flowchart 400, e.g., in some embodiments. For example, example flowchart 400 may be implemented by signal characteristics aggregator 202 and parameter determiner 204. Various embodiments may implement one or more steps shown in FIG. 4, e.g., with additional and/or alternative steps. Further structural and operational embodiments will be apparent to persons skilled in the relevant art(s) based on the following description of FIG. 4.

Flowchart 400 includes step 402. In step 402, offline parameters (e.g., thresholds) may be loaded for pen signal characterizer(s). For example, as shown in FIG. 1, pen signal characterizer(s) 114 may load parameter(s) 112, which may be determined offline (e.g., as default parameters for many or all computing devices 102). TC 118 may execute signal characterizer(s) 114 using parameter(s) 112.

In step 404, a rough hover estimation (RHE) may be performed based on detected signals. For example, as shown in FIGS. 1 and 2, online tuner(s) 116 (e.g., signal characteristics aggregator 202) may estimate hover height based on one or more calculations and/or by looking up an estimated hover height in LUT(s) 208 based on detected signals and/or signal characteristics/statistics. Detected touch signals (e.g., by pen 132 and/or finger) may be used as baseline to help estimate hover range, e.g., 0-2 mm, 3-7 mm, 7-10 mm, etc. A normalized signal estimation may be used to determine whether the hover height is low, medium or high as a rough estimation of the hover range. Touch may occur intentionally or unintentionally. Touch may inject noise. A pen touch may be accompanied by a hand touch (e.g., palm, finger), such as when a user might place a hand on the screen with a pen in order to write, which may render pen touches unreliable to accumulate detected signal statistics related to touch.

In step 406, a determination may be made whether one or more conditions are satisfied, such as whether there is no touch. A determination that the condition is satisfied (e.g., there is no touch) may lead to aggregation of signal characteristics/statistics in step 408. A determination that the condition is not satisfied (e.g., there is touch) may lead to exit at step 408 (e.g., because there is a lack of an opportunity to make use of detected signals to tune parameter(s) if the pen is touching the digitizer). For example, as shown in FIGS. 1 and 2, online tuner(s) 116 (e.g., signal characteristics aggregator 202) may determine whether there is no touch, or whether the estimated hover height meets predetermined tolerances (e.g., greater than a first threshold distance and less than a second threshold distance) to determine whether the pen (e.g., pen 132) is hovering or touching digitizer 108 and use the determination about the condition to aggregate statistics or wait for an opportunity to aggregate statistics when pen 132 is hovering above digitizer 108.

In step 410, pen signal statistics (e.g., gradient(s) (Grad2, Grad3), mean gradient, average gradient) may be aggregated (e.g., because the condition was satisfied in step 406). For example, as shown in FIGS. 1 and 2, online tuner(s) 116 (e.g., signal characteristics aggregator 202) may selectively use signals detected by the digitizer array while the pen is in use with the touch display to (e.g., opportunistically) aggregate pen signal characteristics/statistics for the selected detected signals.

In step 412, a determination may be made whether the number of pen signal samples meets a sample threshold. For example, as shown in FIGS. 1 and 2, online tuner(s) 116 (e.g., parameter determiner 204) may determine whether the number of detected pen signal samples and/or the number of pen signal characteristics/statistics determined based on the detected signal samples are sufficient to select one or more online-tuned parameter candidates. A determination that there are insufficient pen signal samples or characteristics/statistics may cause a return to step 404 to (e.g., opportunistically) aggregate signal characteristics/statistics based on detected signal samples. A determination that there are sufficient samples or characteristics/statistics may lead to step 414 to determine online tuned parameter(s). For example, online tuner(s) 116 (e.g., parameter determiner 204) may determine whether the number of detected pen signal samples and/or the number of pen signal characteristics/statistics determined based on the detected signal samples is/are greater than 1000 (e.g., or other threshold(s)).

In step 414, online tuned parameter candidate(s) (e.g., signal characterization thresholds, such as Signal Norm, Hover height norm, center/border handle) may be determined for pen signal characterizer(s). Step 414 may exit to step 408, which may exit example flowchart 400 for opportunistic signal aggregation. For example, as shown in FIGS. 1 and 2, online tuner(s) 116 (e.g., parameter determiner 204) may determine one or more pen signal characterization parameters based on the aggregated signal characteristics/statistics. Parameter determiner 204 may use the pen signal characteristics/statistics, for example, to look up one or more online tuned parameter candidates in LUT(s) 208 for pen signal characterizer(s).

Figure 5:
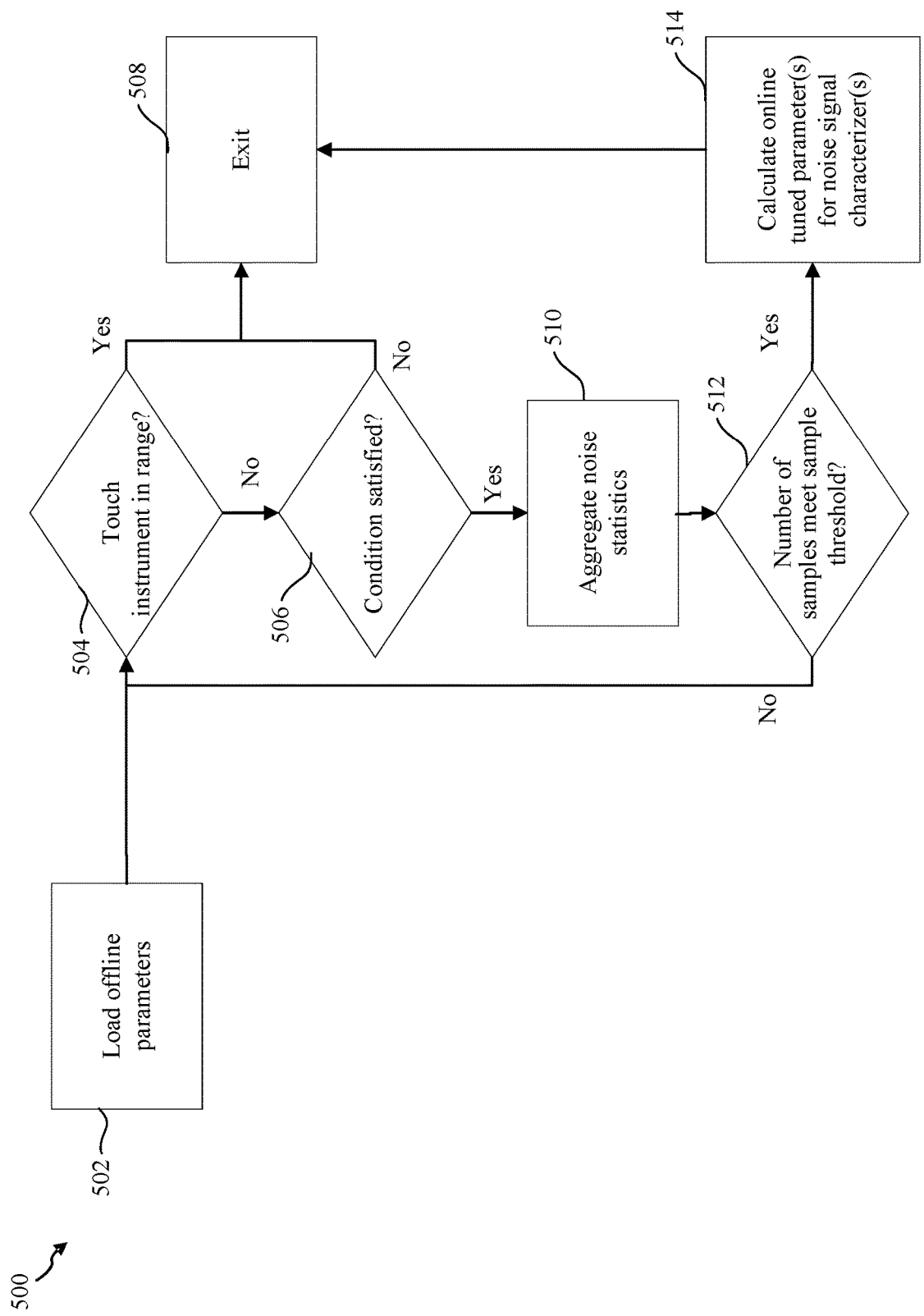
FIG. 5 shows a flowchart of an example process for calculating noise signal boundary determination parameters, in accordance with an embodiment.

FIG. 5 shows a flowchart 500 of a process for calculating noise signal boundary determination parameters, in accordance with an embodiment. FIG. 5 shows an example flowchart 500 of a process for aggregating noise characteristics/statistics and using them to determine online tuned parameter candidate(s). Online tuner(s) 116, as shown by examples in FIGS. 1 and 2, may operate according to flowchart 500, e.g., in some embodiments. For example, example flowchart 500 may be implemented by signal characteristics aggregator 202 and parameter determiner 204. Various embodiments may implement one or more steps shown in FIG. 5 with additional and/or alternative steps. Further structural and operational embodiments will be apparent to persons skilled in the relevant art(s) based on the following description of FIG. 5.

Flowchart 500 includes step 502. In step 502, offline parameters (e.g., thresholds) may be loaded for noise signal characterizer(s). For example, as shown in FIG. 1, noise signal characterizer(s) 114 may load parameter(s) 112, which may be determined offline (e.g., as default parameters for many or all computing devices 102). TC 118 may execute signal characterizer(s) 114 using parameter(s) 112.

In step 504, a determination may be made to determine wither the pen is in range. For example, as shown in FIGS. 1 and 2, online tuner(s) 116 (e.g., signal characteristics aggregator 202) may determine whether pen 132 is "in range," meaning that pen 132 is in sufficiently proximate (close enough) to computing device 102 for computing device 102 be able to track pen 132, such as in a distance range from computing device 102 from 0 mm to 2-3 cm (depending on the particular pen and computing device communication configurations and capabilities).

In step 506, a determination may be made whether one or more conditions are satisfied, such as whether the pen does not touch the touchscreen. A rough hover height estimation (RHE) may be performed based on detected signals. A determination that the condition is satisfied (e.g., there is no touch) may lead to aggregation of signal characteristics/statistics in step 508. A determination that the condition is not satisfied (e.g., there is touch) may lead to exit at step 508 (e.g., because there is a lack of an opportunity to make use of detected signals to tune parameter(s) if the pen is touching the digitizer). For example, as shown in FIGS. 1 and 2, online tuner(s) 116 (e.g., signal characteristics aggregator 202) may estimate hover height based on one or more calculations and/or by looking up an estimated hover height in LUT(s) 208 based on detected signals and/or signal characteristics/statistics. Online tuner(s) 116 (e.g., signal characteristics aggregator 202) may determine whether the estimated hover height meets predetermined tolerances to determine whether the pen (e.g., pen 132) is hovering or touching digitizer 108 and use the determination about the condition to aggregate statistics or wait for an opportunity to aggregate statistics when pen 132 is hovering above digitizer 108.

In step 510, noise signal statistics (e.g., gradient(s) (Grad2, Grad3), mean gradient, average gradient) may be aggregated (e.g., because the condition was satisfied in step 506). For example, as shown in FIGS. 1 and 2, online tuner(s) 116 (e.g., signal characteristics aggregator 202) may selectively use signals detected by the digitizer array while the pen is in use with the touch display to (e.g., opportunistically) aggregate noise signal characteristics/statistics for the selected detected signals.

In step 512, a determination may be made whether the number of noise signal samples meets a sample threshold. For example, as shown in FIGS. 1 and 2, online tuner(s) 116 (e.g., parameter determiner 204) may determine whether the number of detected noise signal samples and/or the number of noise signal characteristics/statistics determined based on the detected signal samples are sufficient to select one or more online-tuned parameter candidates. A determination that there are insufficient noise signal samples or characteristics/statistics may cause a return to step 504 to (e.g., opportunistically) aggregate noise signal characteristics/statistics based on detected signal samples. A determination that there are sufficient noise signal samples or characteristics/statistics may lead to step 514 to determine online tuned parameter(s) for noise characterization. For example, online tuner(s) 116 (e.g., parameter determiner 204) may determine whether the number of detected signal samples and/or the number of noise signal characteristics/statistics determined based on the detected noise signal samples is/are greater than 1000 (e.g., or other threshold(s)).

In step 514, online tuned parameter candidate(s) (e.g., noise signal characterization thresholds, such as Signal Norm, Hover height norm, center/border handle) may be determined for noise signal characterizer(s). Step 514 may exit to step 508, which may exit example flowchart 500 for opportunistic signal aggregation. For example, as shown in FIGS. 1 and 2, online tuner(s) 116 (e.g., parameter determiner 204) may determine one or more parameters based on the aggregated noise signal characteristics/statistics. Parameter determiner 204 may use the noise signal characteristics/statistics, for example, to look up one or more online tuned parameter candidates in LUT(s) 208 for noise signal characterizer(s) 114.

Figure 6:
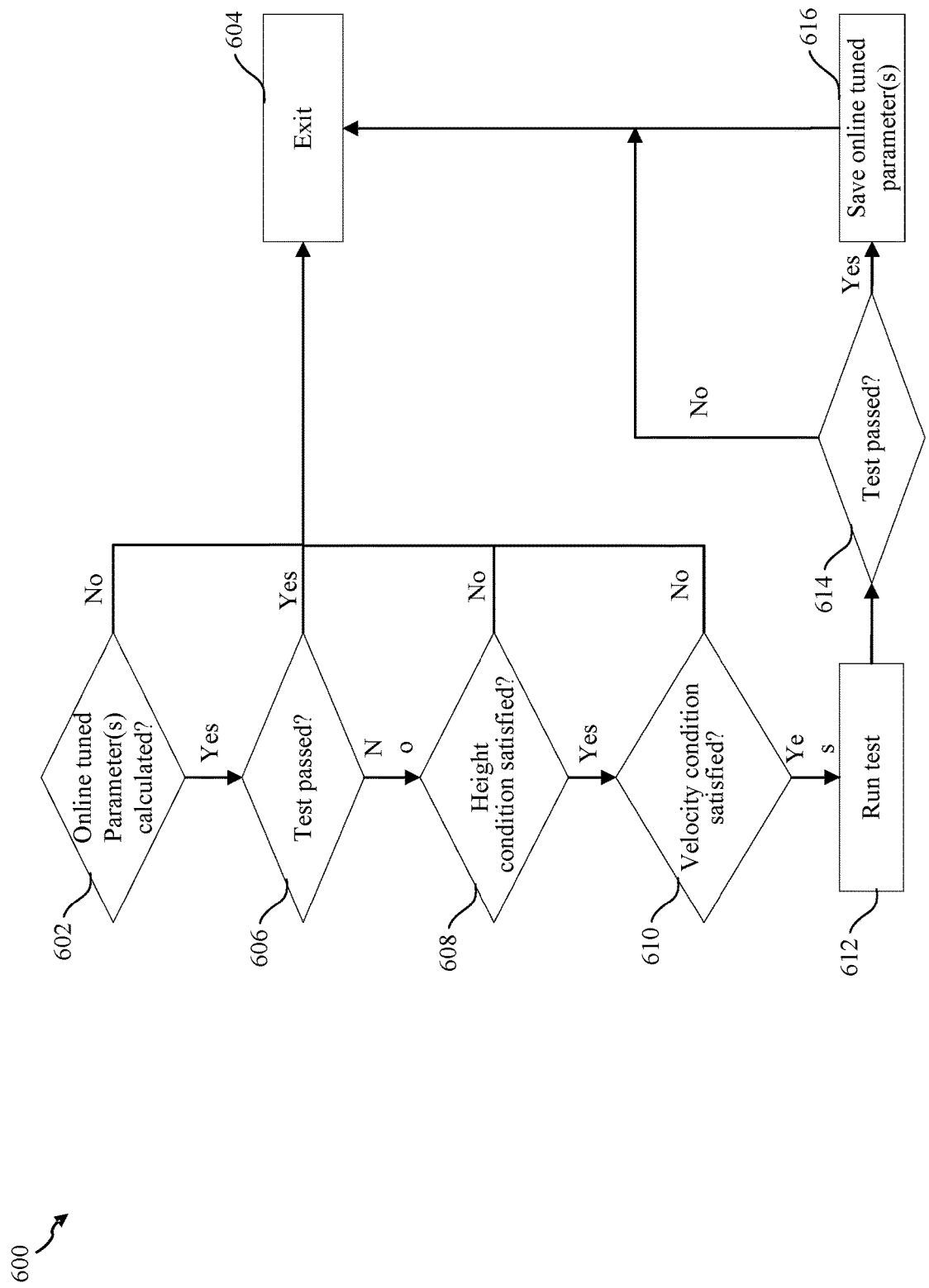
FIG. 6 shows a flowchart of an example process for testing, validating, and implementing touchscreen pen signal and noise signal boundary determination parameters, in accordance with an embodiment.

FIG. 6 shows a flowchart 600 of a process for testing, validating, and implementing pen signal and noise signal boundary determination parameters, in accordance with an embodiment. Online tuner(s) 116, as shown by examples in FIGS. 1 and 2, may operate according to flowchart 600 in some embodiments. For example, example flowchart 600 may be implemented by parameter tester 206. Various embodiments may implement one or more steps shown in FIG. 6 with additional and/or alternative steps. Further structural and operational embodiments will be apparent to persons skilled in the relevant art(s) based on the following description of FIG. 6.

Flowchart 600 includes step 602. In step 602, a determination may be made whether the online tuner calculated online tuned parameter candidates. If not, flowchart 600 may exit at step 604. If so, flowchart 600 may proceed to step 606. For example, as shown in FIGS. 1 and 2, online tuner(s) 116 (e.g., parameter tester 206) may begin by confirming that parameter determiner 204 determined one or more online tuned parameter candidates.

In step 606, a determination may be made whether the one or more parameter candidates already passed testing. If so, flowchart 600 may exit at step 604. If not, flowchart 600 may proceed to step 608. For example, as shown in FIGS. 1 and 2, online tuner(s) 116 (e.g., parameter tester 206) may determine whether the one or more parameter candidates were already verified during online testing.

In step 608, a determination may be made whether one or more conditions are satisfied, e.g., whether the pen is touching the screen. If not, flowchart 600 may exit at step 604. If so, flowchart 600 may proceed to step 610. For example, as shown in FIGS. 1 and 2, online tuner(s) 116 (e.g., parameter tester 206) may perform opportunistic (e.g., conditional) testing. Online tuner(s) 116 (e.g., parameter tester 206) may estimate hover height based on one or more calculations and/or by looking up an estimated hover height in LUT(s) 208 based on detected signals and/or signal characteristics/statistics. Online tuner(s) 116 (e.g., parameter tester 206) may determine whether there is no touch, or if the estimated hover height meets predetermined tolerances (e.g., greater than a first threshold distance and less than a second threshold distance), to determine whether the pen (e.g., pen 132) is hovering or touching digitizer 108 and use the determination about the condition to determine whether to perform online testing of the one or more parameter candidates in signal characterizer(s) 114.

In step 610, a determination may be made whether one or more conditions are satisfied, such as whether pen velocity is below a threshold. If not, flowchart 600 may exit at step

604. If so, flowchart 600 may proceed to step 612. For example, as shown in FIGS. 1 and 2, online tuner(s) 116 (e.g., parameter tester 206) may perform opportunistic (e.g., conditional) testing. Online tuner(s) 116 (e.g., parameter tester 206) may estimate pen location/position associated with detected signal samples, which may be associated with times. Online tuner(s) 116 (e.g., parameter tester 206) may estimate the velocity of pen 132 using the estimated pen locations and times associated with detected signal samples. Online tuner(s) 116 (e.g., parameter tester 206) may determine whether the estimated velocity of pen 132 is below a (pre)configured velocity threshold to determine whether to perform online testing of the one or more parameter candidates in signal characterizer(s) 114.

In step 612, online testing may be performed. For example, as shown in FIGS. 1 and 2, online tuner(s) 116 (e.g., parameter tester 206) may perform opportunistic (e.g., conditional) testing, e.g., after confirming the conditions in steps 602, 606, 608 and 610 were satisfied. In a first example of an online test, beginning with default threshold values, calculate a pen region of interest (ROI) and one or more reference electrodes for noise removal, determine new threshold values, use the new threshold values, and then confirm the new threshold values are different up to an acceptable range. In a second example of an online test, the hover height may be calculated based on a gradient with the new threshold values, compared to the signal-based hover higher, and then confirmed that they within a predetermined range of each other.

In step 614, a determination may be made whether the test passed. If so, flowchart 600 may proceed to step 616. If not, flowchart may exit at step 604. For example, as shown in FIGS. 1 and 2, online tuner(s) 116 (e.g., parameter tester 206) may determine whether the one or more parameter candidates under test in one or more signal characterizers 114 passed one or more parameter validation tests. If the one or more parameter candidates failed one or more tests, online tuner(s) 116 (e.g., parameter tester 206) may exit testing at step 604 (e.g., and discard the parameter candidates).

At step 616, validated online tuned parameter(s) may be saved. For example, as shown in FIGS. 1 and 2, online tuner(s) 116 (e.g., parameter tester 206) may save the one or more validated parameter candidates as parameter(s) 112 in storage 110. Signal characterizer(s) 114 may, e.g., subsequently, use stored, validated, online-tuned parameter(s) 112, creating online-tuned signal characterizer(s) 114.

Figure 7:
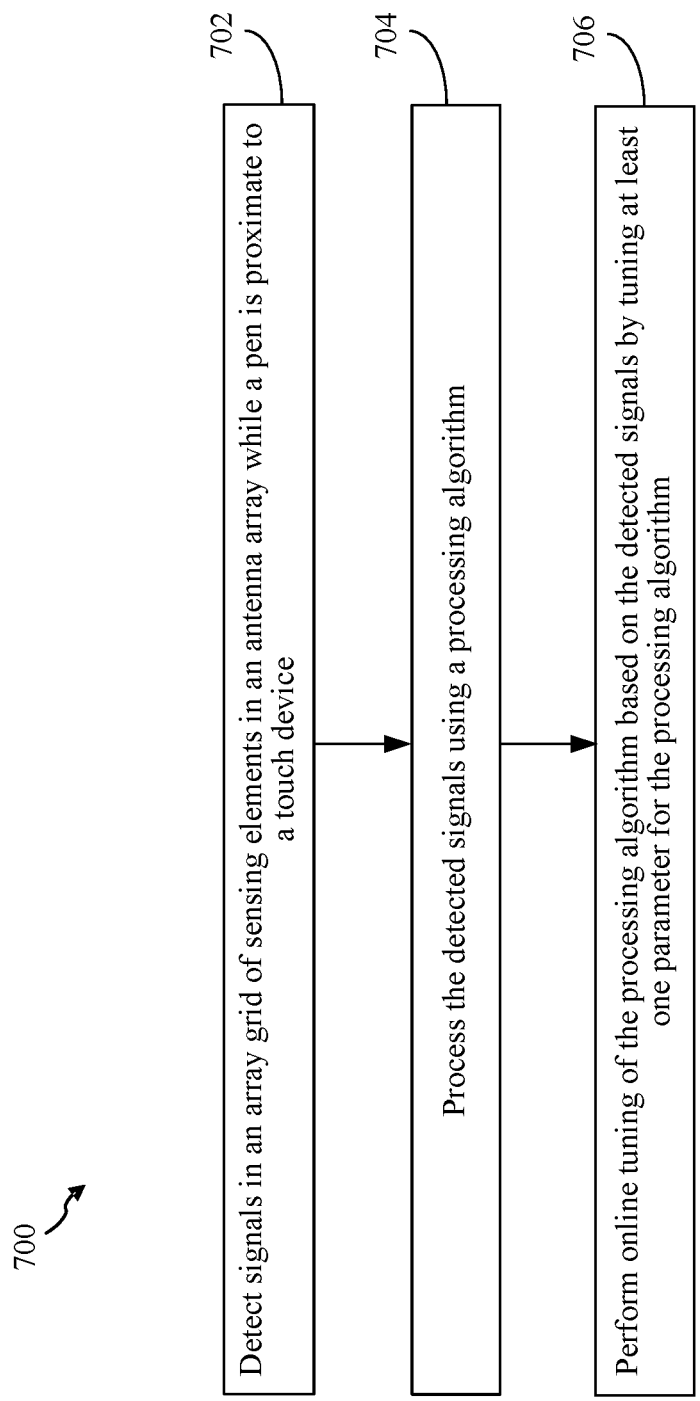
FIG. 7 shows a flowchart of a process for online tuning of touchscreen pen characterizations, in accordance with an embodiment.

As discussed herein, systems, methods, and computer program products may perform online tuning of pen characterizations. For example, FIG. 7 shows a flowchart 700 of a process for online tuning of pen characterizations, in accordance with an embodiment. Flowchart 700 is a further embodiment of step 306 of flowchart 300, as described with respect to FIG. 3. Online tuner(s) 116 (e.g., parameter tester 206), as shown in FIGS. 1 and 2, may operate according to flowchart 300, in embodiments. Steps shown in example flowchart 700 need not be performed in all embodiments. Further structural and operational embodiments will be apparent to persons skilled in the relevant art(s) based on the following description of FIG. 7.

Flowchart 700 includes step 702. In step 702, signals may be detected in an array grid of sensing elements in the antenna array while the pen is proximate to (e.g., in use with) the touch device. For example, as shown in FIG. 1, antenna array 120 may detect pen signal while a user is using pen 132.

In step 704, the detected signals may be processed (e.g., characterized) using a processing algorithm. For example, as shown in FIG. 1, TC 118 may execute signal characterizer(s) 114 using parameter(s) 112 to characterize the detected signals.

In step 706, online tuning of the processing algorithm may be performed based on the detected signals by tuning at least one parameter for the processing algorithm (e.g., to create an online-tuned processing algorithm). For example, as shown in FIGS. 1 and 2, TC 118 may execute online tuner(s) 116 (e.g., or subcomponents thereof) to opportunistically aggregate signal characteristics/statistics for pen signal and/or noise signal, use the aggregated signal characteristics/statistics to look up one or more online tuned parameter candidates in LUT(s) 208 for pen signal characterizer(s) and/or noise signal characterizer(s) 114. The online tuned parameter candidates may be deployed in one or more signal characterizers 114 with or without testing validation, creating one or more online-tuned processing algorithms (e.g., signal characterizers).

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
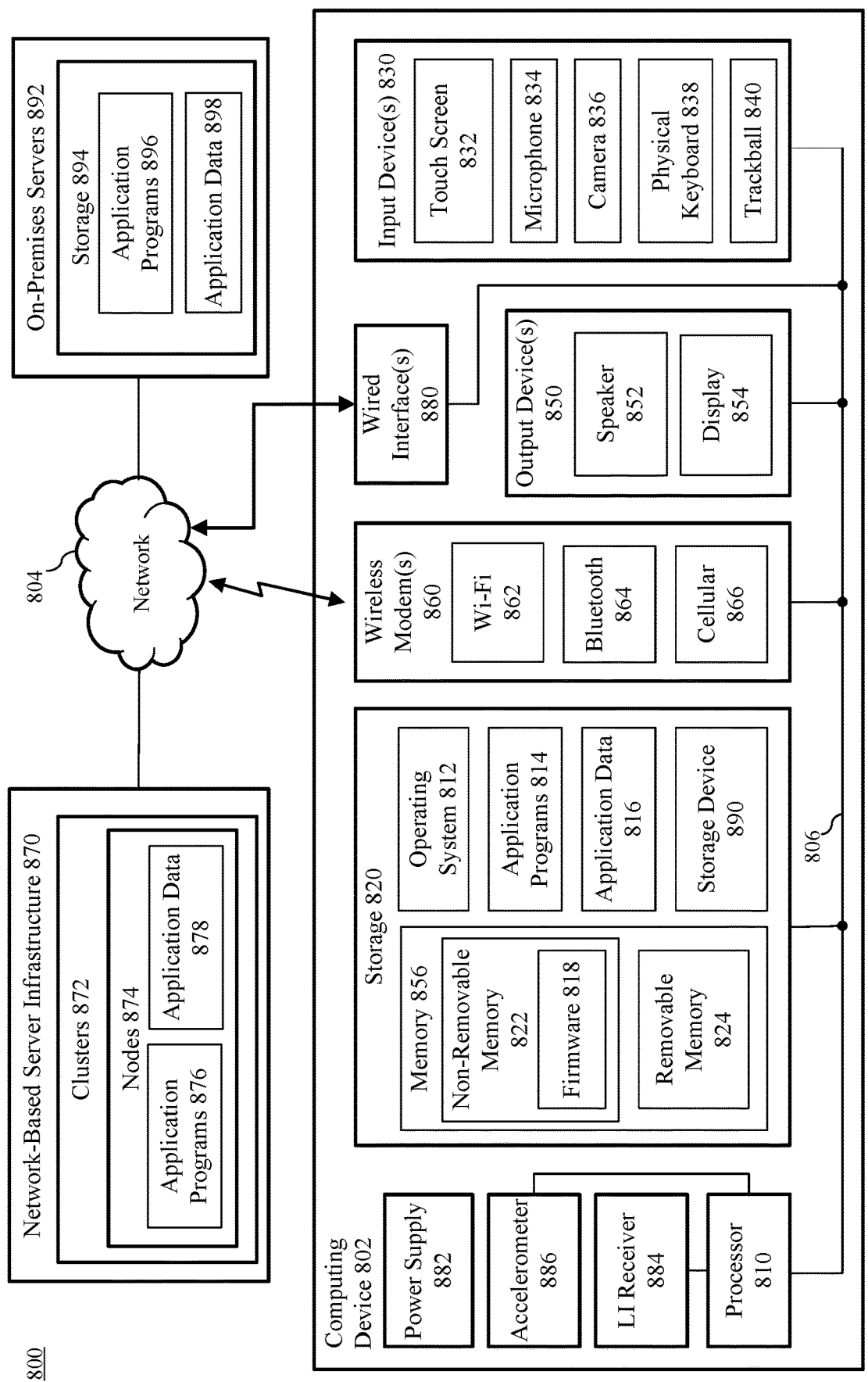
FIG. 8 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 8. FIG. 8 shows a block diagram of an exemplary computing environment 800 that includes a computing device 802. Computing device 802 is an example of computing device 102 of FIG. 1, which may include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc., and may include one or more wired and/or wireless portions. Network 804 may additionally or alternatively include a cellular network for cellular communications. Computing device 802 is described in detail as follows.

Computing device 802 can be any of a variety of types of computing devices. For example, computing device 802 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 802 may alternatively be a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 890. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 830 includes a touchscreen 832, a microphone 834, a camera 836, a physical keyboard 838, and a trackball 840. Not all components of computing device 802 shown in FIG. 8 are present in all embodiments, additional components not shown may be present, and any combination of the components may be present in a particular embodiment. These components of computing device 802 are described as follows.

A single processor 810 (e.g., central processing unit (CPU), microcontroller, a microprocessor, signal processor, ASIC (application specific integrated circuit), and/or other physical hardware processor circuit) or multiple processors 810 may be present in computing device 802 for performing such tasks as program execution, signal coding, data processing, input/output processing, power control, and/or other functions. Processor 810 may be a single-core or multi-core processor, and each processor core may be single-threaded or multithreaded (to provide multiple threads of execution concurrently). Processor 810 is configured to execute program code stored in a computer readable medium, such as program code of operating system 812 and application programs 814 stored in storage 820. Operating system 812 controls the allocation and usage of the components of computing device 802 and provides support for one or more application programs 814 (also referred to as "applications" or "apps"). Application programs 814 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) that may be present to communicatively couple processor 810 to various other components of computing device 802, although in other embodiments, an alternative bus, further buses, and/or one or more individual signal lines may be present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 890, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 822 may include main memory and may be separate from or fabricated in a same integrated circuit as processor 810. As shown in FIG. 8, non-removable memory 822 stores firmware 818, which may be present to provide low-level control of hardware. Examples of firmware 818 include BIOS (Basic Input/Output System, such as on personal computers) and boot firmware (e.g., on smart phones). Removable memory 824 may be inserted into a receptacle of or otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 890 may be present that are internal and/or external to a housing of computing device 802 and may or may not be removable. Examples of storage device 890 include a hard disk drive, a SSD, a thumb drive (e.g., a USB (Universal Serial Bus) flash drive), or other physical storage device.

One or more programs may be stored in storage 820. Such programs include operating system 812, one or more application programs 814, and other program modules and program data. Examples of such application programs may include, for example, computer program logic (e.g., computer program code/instructions) for implementing one or more of signal characterizer(s) 114, online tuner(s) 116, signal characteristics aggregator 202, parameter determiner 204, parameter tester 206, parameter(s) 112, LUT(s) 208, along with any components and/or subcomponents thereof, as well as the flowcharts/flow diagrams (e.g., flowcharts 300, 400, 500, 600, and/or 700) described herein, including portions thereof, and/or further examples described herein.

Storage 820 also stores data used and/or generated by operating system 812 and application programs 814 as application data 816. Examples of application data 816 include web pages, text, images, tables, sound files, video data, and other data, which may also be sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 802 through one or more input devices 830 and may receive information from computing device 802 through one or more output devices 850. Input device(s) 830 may include one or more of touchscreen 832, microphone 834, camera 836, physical keyboard 838 and/or trackball 840 and output device(s) 850 may include one or more of speaker 852 and display 854. Each of input device(s) 830 and output device(s) 850 may be integral to computing device 802 (e.g., built into a housing of computing device 802) or external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 may display information, as well as operating as touchscreen 832 by receiving user commands and/or other information (e.g., by touch, finger gestures, virtual keyboard, etc.) as a user interface. Any number of each type of input device(s) 830 and output device(s) 850 may be present, including multiple microphones 834, multiple cameras 836, multiple speakers 852, and/or multiple displays 854.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). Wireless modem 860 may also or alternatively include other radio-based modem types, such as a Bluetooth modem 864 (also referred to as a "Bluetooth device") and/or Wi-Fi modem 862 (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and may receive power from a battery internal to computing device 802, and/or from a power cord plugged into a power port of computing device 802 (e.g., a USB port, an A/C power port). LI receiver 884 may be used for location determination of computing device 802 and may include a satellite navigation receiver such as a Global Positioning System (GPS) receiver or may include other type of location determiner configured to determine location of computing device 802 based on received information (e.g., using cell tower triangulation, etc.). Accelerometer 886 may be present to determine an orientation of computing device 802.

Note that the illustrated components of computing device 802 are not required or all-inclusive, and fewer or greater numbers of components may be present as would be recognized by one skilled in the art. For example, computing device 802 may also include one or more of a gyroscope, barometer, proximity sensor, ambient light sensor, digital compass, etc. Processor 810 and memory 856 may be co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein may be stored in storage 820 and executed by processor 810.

In some embodiments, server infrastructure 870 may be present in computing environment 800 and may be communicatively coupled with computing device 802 via network 804. Server infrastructure 870, when present, may be a network-accessible server set (e.g., a cloud-based environment or platform). As shown in FIG. 8, server infrastructure 870 includes clusters 872. Each of clusters 872 may comprise a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. Any of nodes 874 may be a storage node that comprises a plurality of physical storage disks, SSDs, and/or other physical storage devices that are accessible via network 804 and are configured to store data associated with the applications and services managed by nodes 874. For example, as shown in FIG. 8, nodes 874 may store application data 878.

Each of nodes 874 may, as a compute node, comprise one or more server computers, server systems, and/or computing devices. For instance, a node 874 may include one or more of the components of computing device 802 disclosed herein. Each of nodes 874 may be configured to execute one or more software applications (or "applications") and/or services and/or manage hardware resources (e.g., processors, memory, etc.), which may be utilized by users (e.g., customers) of the network-accessible server set. For example, as shown in FIG. 8, nodes 874 may operate application programs 876. In an implementation, a node of nodes 874 may operate or comprise one or more virtual machines, with each virtual machine emulating a system architecture (e.g., an operating system), in an isolated manner, upon which applications such as application programs 876 may be executed.

In an embodiment, one or more of clusters 872 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 872 may be a datacenter in a distributed collection of datacenters. In embodiments, exemplary computing environment 800 comprises part of a cloud-based platform such as Amazon Web Services® of Amazon Web Services, Inc., or Google Cloud Platform™ of Google LLC, although these are only examples and are not intended to be limiting.

In an embodiment, computing device 802 may access application programs 876 for execution in any manner, such as by a client application and/or a browser at computing device 802. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 802 may additionally and/or alternatively synchronize copies of application programs 814 and/or application data 816 to be stored at network-based server infrastructure 870 as application programs 876 and/or application data 878. For instance, operating system 812 and/or application programs 814 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 820 at network-based server infrastructure 870.

In some embodiments, on-premises servers 892 may be present in computing environment 800 and may be communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 may be shared by on-premises servers 892 between computing devices of the organization, including computing device 802 (when part of an organization) through a local network of the organization, and/or through further networks accessible to the organization (including the Internet). Furthermore, on-premises servers 892 may serve applications such as application programs 896 to the computing devices of the organization, including computing device 802. Accordingly, on-premises servers 892 may include storage 894 (which includes one or more physical storage devices such as storage disks and/or SSDs) for storage of application programs 896 and application data 898 and may include one or more processors for execution of application programs 896. Still further, computing device 802 may be configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 may be used to implement systems, clients, or devices, or components/subcomponents thereof, disclosed elsewhere herein. In other embodiments, a combination of computing device 802, network-based server infrastructure 870, and/or on-premises servers 892 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) may be stored in storage 820. Such computer programs may also be received via wired interface(s) 880 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

V. Additional Example Embodiments

Systems, methods, and instrumentalities are described herein related to online tuning of pen characterizations. Online tuning may be performed (e.g., with supervised learning based on an offline factory characterization model) during use of a pen with a touch device. A digitizer may detect signals associated with the pen and noise. A touch controller may execute a signal characterization model that characterizes the detected signals and an online tuner that (e.g., opportunistically) processes the detected signals to perform online tuning (e.g., calibration) of (e.g., at least one parameter of) the signal characterization model. Online testing may validate an online-tuned signal characterization model for online use. Tuning may be based on signal statistics, such as mean or average signal gradients in the detected signals. Parameters may include decision boundary thresholds (e.g., to determine a noise boundary). Signal characterization models may include positioning, signal locating, noise reduction, communication decoding, etc.

A system for online tuning of pen characterizations may comprise, for example, a processor circuit and a memory. The memory stores program code that is executable by the processor circuit. The program code comprises an online tuning system for pen characterizations. Online tuning may be performed during use of a touch device with a pen, for example, with supervised learning (e.g., based on a factory or default characterization model developed offline).

A touch device may be configured to communicate (e.g., wirelessly interface or electrically couple) with a pen. A touch device may include a digitizer with an antenna array configured to detect signals in an array grid of sensing elements in the antenna array while the pen is proximate to (e.g., in use relative to) the touch device. A processing circuit (e.g., a touch controller in the digitizer) may be electrically coupled to the antenna array. The processing circuit may (e.g., be configured to) execute a processing algorithm (e.g., signal characterizer or characterization model) configured to process (e.g., characterize) the detected signals. The processing circuit may be configured to execute an online tuning algorithm configured to perform online tuning (e.g., calibration, customization) of the processing algorithm based on the detected signals by tuning at least one parameter of the processing algorithm to create an online-tuned processing algorithm (e.g., with online-tuned parameter(s)).

In some examples, online tuning may be performed opportunistically, e.g., based on satisfaction of at least one online tuning condition. Opportunistic processing of the detected signals may be performed based on satisfaction of at least one online tuning condition. The online tuning (e.g., calibration) of the at least one parameter may be performed based on the opportunistic processing of the detected signals.

In various examples, online tuning may be performed with a variety of processing algorithms that may be improved with online tuning, such as one or more of: a positioning algorithm configured to determine a center of mass of the pen (e.g., relative to the antenna array); a signal locating algorithm configured to determine signal boundaries for a (e.g., coupling, proximity) signal associated with the pen; a noise reduction algorithm configured to determine a noise boundary; and a communication algorithm configured to determine signal decoding parameters for a communication signal associated with the pen.

In some examples (e.g., of conditional or opportunistic processing), detected signals may be processed to estimate a distance of the pen from the touch device. Signal statistics for the detected signals may be determined (e.g., and aggregated), for example, if the estimated distance meets predetermined tolerances. The at least one parameter (e.g., a threshold decision boundary) may be tuned based on the aggregated signal statistics (e.g., by generating at least one tuned parameter).

In some examples, signal statistics may comprise, for example, an average signal gradient between antennas and/or a mean signal gradient between antennas.

In some examples, a tunable parameter may comprise a decision boundary threshold that the processing algorithm uses to identify a boundary for at least one of noise signal or pen signal or to distinguish between noise signal and pen signal.

In some examples, a processing algorithm may be tuned (e.g., updated or reconfigured) based on online testing and validation. In some examples, an online test of the online-tuned processing algorithm may be performed while the pen is in proximity to the touch device. The online-tuned processing algorithm may be validated if the online test is passed. The online-tuned configuration of the processing algorithm may be validated if the test is passed. The online-validated online-tuned configuration of the processing algorithm may be implemented (e.g., in place of the offline configuration of the processing algorithm).

A method for online tuning of pen characterizations may be implemented, for example, in a touch device comprising an antenna (e.g., electrode) array configured to communicate (e.g., wirelessly interface, electrically couple) with a pen. The method may comprise, for example, detecting signals in an array grid of sensing elements in the antenna array while the pen is proximate to (e.g., in use with) the touch device; processing the detected signals using a processing algorithm (e.g., signal characterizer); and performing online tuning (e.g., calibration, customization) of the processing algorithm based on the detected signals by tuning at least one parameter for the processing algorithm (e.g., to create an online-tuned processing algorithm).

In some examples, performing the online tuning may comprise performing opportunistic processing of the detected signals based on satisfaction of at least one online tuning condition; and performing the online tuning (e.g., calibration) of the at least one parameter based on the opportunistic processing of the detected signals.

In some examples, the opportunistic processing may comprise estimating a distance of the pen from the touch device based on the detected signals; aggregating signal statistics for the detected signals if the estimated distance if the estimated distance meets predetermined tolerances (e.g., online tuning condition); and tuning the at least one parameter (e.g., threshold decision boundary) based on the aggregated signal statistics by generating at least one tuned parameter.

In some examples, the signal statistics may comprise at least one of: an average signal gradient between antennas or a mean signal gradient between antennas.

In some examples, the at least one parameter may comprise at least one decision boundary threshold the processing algorithm uses to identify a boundary for at least one of noise signal or pen signal or to distinguish between noise signal and pen signal.

In some examples, the processing algorithm may comprise at least one of: a positioning algorithm configured to determine a center of mass of the pen; a signal locating algorithm configured to determine signal boundaries for a (e.g., coupling, proximity) signal associated with the pen; a noise reduction algorithm configured to determine a noise boundary; or a communication algorithm configured to determine signal decoding parameters for a communication signal associated with the pen.

In some examples, the method may (e.g., further) comprise performing an online test of the online-tuned processing algorithm while the pen is in proximity to the touch device; validating the online-tuned processing algorithm if the online test is passed; and replacing the processing algorithm with the validated online-tuned processing algorithm.

A computer-readable storage medium is described herein. The computer-readable storage medium has computer program logic recorded thereon that when executed by a processor circuit causes the processor circuit to perform a method. The processing circuit of a touch device may comprise an antenna (e.g., electrode) array configured to communicate (e.g., wirelessly interface, electrically couple) with a pen. The method may comprise, for example, detecting signals in an array grid of sensing elements in the antenna array while the pen is proximate to the touch device; processing the detected signals using a processing algorithm; and performing online tuning (e.g., calibration) of the processing algorithm based on the detected signals by tuning at least one parameter for the processing algorithm (e.g., to create an online-tuned processing algorithm).

In some examples, performing the online tuning may comprise performing opportunistic processing of the detected signals based on satisfaction of at least one online tuning condition; and performing the online tuning (e.g., calibration) of the at least one parameter based on the opportunistic processing of the detected signals.

In some examples, the opportunistic processing may comprise estimating a distance of the pen from the touch device based on the detected signals; aggregating signal statistics for the detected signals if the estimated distance meets predetermined tolerances (e.g., online tuning condition); tuning the at least one parameter (e.g., threshold decision boundary) based on the aggregated signal statistics by generating at least one tuned parameter.

In some examples, the signal statistics may comprise at least one of: an average signal gradient between antennas or a mean signal gradient between antennas.

In some examples, the processing algorithm may comprise at least one of: a positioning algorithm configured to determine a center of mass of the pen; a signal locating algorithm configured to determine signal boundaries for a (e.g., coupling, proximity) signal associated with the pen; a noise reduction algorithm configured to determine a noise boundary; or a communication algorithm configured to determine signal decoding parameters for a communication signal associated with the pen.

In some examples, the method may (e.g., further) comprise, performing an online test of the online-tuned processing algorithm while the pen is in proximity to the touch device; validating the online-tuned processing algorithm if the online test is passed; and replacing the processing algorithm with the validated online-tuned processing algorithm.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system in a touch device configured to communicate with a pen, the system comprising:
an antenna array configured to detect signals in an array grid of sensing elements in the antenna array while the pen is proximate to the touch device; and
a processing circuit, electrically coupled to the antenna array, configured to execute a processing algorithm to process the detected signals;
the processing circuit further configured to execute an online tuning algorithm to perform online tuning of the processing algorithm based on the detected signals by online tuning at least one parameter of the processing algorithm to create an online-tuned processing algorithm, the processing circuit configured to:
  calculate an online tuned parameter for the processing algorithm based on at least one signal of the detected signals,
  validate the online tuned parameter according to an online test, and
  in response to a validation of the online tuned parameter, process further signals detected by the antenna array based at least on the online-tuned processing algorithm that implements the online tuned parameter.

2. The system of claim 1, wherein the processing circuit is configured to:
  perform conditional processing of the detected signals based on at least one online tuning condition being met; and
  perform the online tuning of the at least one parameter based on the conditional processing of the detected signals.

3. The system of claim 1, wherein the processing algorithm comprises at least one of:
  a positioning algorithm for determining a center of mass of the pen;
  a signal locating algorithm for determining signal boundaries for a signal associated with the pen;
  a noise reduction algorithm for determining a noise boundary; or
  a communication algorithm for determining signal decoding parameters for a communication signal associated with the pen.

4. The system of claim 1, the processing circuit further configured to:
  execute the online test while the pen is in proximity to the touch device;
  validate the online-tuned processing algorithm responsive to passing the online test; and
  replace the processing algorithm with the validated online-tuned processing algorithm.

5. A system in a touch device configured to communicate with a pen, the system comprising:
  an antenna array configured to detect signals in an array grid of sensing elements in the antenna array while the pen is proximate to the touch device; and
  a processing circuit, electrically coupled to the antenna array, configured to execute a processing algorithm to process the detected signals;
  the processing circuit configured to execute an online tuning algorithm to perform online tuning of the processing algorithm based on the detected signals by online tuning at least one parameter of the processing algorithm to create an online-tuned processing algorithm;
  wherein the processing circuit is configured to:
    perform conditional processing of the detected signals based on at least one online tuning condition being met, and
    perform the online tuning of the at least one parameter based on the conditional processing of the detected signals; and
  wherein to perform the conditional processing, the processing circuit is configured to:
    estimate a distance of the pen from the touch device based on the detected signals,
    aggregate signal statistics for the detected signals responsive to the estimated distance meeting predetermined tolerances, and
    tune the at least one parameter based on the aggregated signal statistics by generating at least one tuned parameter.

6. The system of claim 5, wherein the signal statistics comprise at least one: an average signal gradient between antennas or a mean signal gradient between antennas.

7. The system of claim 5, wherein the at least one parameter comprises at least one decision boundary threshold the processing algorithm uses to identify a boundary for at least one of noise signal or pen signal or to distinguish between noise signal and pen signal.

8. A method implemented in a touch device comprising an antenna array configured to communicate with a pen, the method comprising:
  detecting signals in an array grid of sensing elements in the antenna array while the pen is proximate to the touch device;
  processing the detected signals using a processing algorithm; and
  performing online tuning of the processing algorithm based on the detected signals by online tuning at least one parameter for the processing algorithm, said performing comprising:
    calculating an online tuned parameter for the processing algorithm based on at least one signal of the detected signals,
    validating the online tuned parameter according to an online test, and
    in response to the validating the online tuned parameter, process further signals detected by the antenna array based at least on the online-tuned processing algorithm that implements the online tuned parameter.

9. The method of claim 8, wherein performing the online tuning comprises:
  performing conditional processing of the detected signals based on at least one online tuning condition being met; and
  performing the online tuning of the at least one parameter based on the conditional processing of the detected signals.

10. The method of claim 8, wherein the processing algorithm comprises at least one of:
  a positioning algorithm for determining a center of mass of the pen;
  a signal locating algorithm for determining signal boundaries for a signal associated with the pen;
  a noise reduction algorithm for determining a noise boundary; or
  a communication algorithm for determining signal decoding parameters for a communication signal associated with the pen.

11. The method of claim 8, further comprising:
  performing the online test while the pen is in proximity to the touch device;
  validating the online-tuned processing algorithm responsive to passing the online test; and
  replacing the processing algorithm with the validated online-tuned processing algorithm.

12. A method implemented in a touch device comprising an antenna array configured to communicate with a pen, the method comprising:
  detecting signals in an array grid of sensing elements in the antenna array while the pen is proximate to the touch device;
  processing the detected signals using a processing algorithm; and performing online tuning of the processing algorithm based on the detected signals by tuning at least one parameter for the processing algorithm;
wherein performing the online tuning comprises:
performing conditional processing of the detected signals based on at least one online tuning condition being met, and
performing the online tuning of the at least one parameter based on the conditional processing of the detected signals; and
wherein the conditional processing comprises:
estimating a distance of the pen from the touch device based on the detected signals,
aggregating signal statistics for the detected signals responsive to the estimated distance meeting predetermined tolerances, and
tuning the at least one parameter based on the aggregated signal statistics by generating at least one tuned parameter.

13. The method of claim 12, wherein the signal statistics comprise at least one of: an average signal gradient between antennas or a mean signal gradient between antennas.

14. The method of claim 13, wherein the at least one parameter comprises at least one decision boundary threshold that the processing algorithm uses to identify a boundary for at least one of noise signal or pen signal or to distinguish between noise signal and pen signal.

15. A computer-readable storage medium having program instructions recorded thereon that, when executed by a processing circuit of a touch device that comprises an antenna array configured to communicate with a pen, implement a method comprising:
detecting signals in an array grid of sensing elements in the antenna array while the pen is proximate to the touch device;
processing the detected signals using a processing algorithm; and
performing online tuning of the processing algorithm based on the detected signals by tuning at least one parameter for the processing algorithm, said performing comprising:
calculating an online tuned parameter for the processing algorithm based on at least one signal of the detected signals,
validating the online tuned parameter according to an online test, and
in response to the validating the online tuned parameter, process further signals detected by the antenna array based at least on the online-tuned processing algorithm that implements the online tuned parameter.

16. The computer-readable storage medium of claim 15, wherein performing the online tuning comprises:
performing conditional processing of the detected signals based on at least one online tuning condition being met; and performing the online tuning of the at least one parameter based on the conditional processing of the detected signals.

17. The computer-readable storage medium of claim 15, wherein the processing algorithm comprises at least one of:
a positioning algorithm for determining a center of mass of the pen;
a signal locating algorithm for determining signal boundaries for a signal associated with the pen;
a noise reduction algorithm for determining a noise boundary; or
a communication algorithm for determining signal decoding parameters for a communication signal associated with the pen.

18. The computer-readable storage medium of claim 15, wherein the method further comprises:
performing the online test while the pen is in proximity to the touch device;
validating the online-tuned processing algorithm responsive to passing the online test; and
replacing the processing algorithm with the validated online-tuned processing algorithm.

19. A computer-readable storage medium having program instructions recorded thereon that, when executed by a processing circuit of a touch device that comprises an antenna array configured to communicate with a pen, implement a method comprising:
detecting signals in an array grid of sensing elements in the antenna array while the pen is proximate to the touch device;
processing the detected signals using a processing algorithm; and
performing online tuning of the processing algorithm based on the detected signals by online tuning at least one parameter for the processing algorithm;
wherein performing the online tuning comprises:
performing conditional processing of the detected signals based on at least one online tuning condition being met, and
performing the online tuning of the at least one parameter based on the conditional processing of the detected signals; and
wherein the conditional processing comprises:
estimating a distance of the pen from the touch device based on the detected signals,
aggregating signal statistics for the detected signals responsive to the estimated distance meeting predetermined tolerances, and
tuning the at least one parameter based on the aggregated signal statistics by generating at least one tuned parameter.

20. The computer-readable storage medium of claim 19, wherein the signal statistics comprise at least one of: an average signal gradient between antennas or a mean signal gradient between antennas.

* * * * *